Patented Sept. 20, 1938

2,130,560

UNITED STATES PATENT OFFICE 2,130,560

PIGMENT SUSPENSION AND METHOD OF PREPARING THE SAME

Walter W. Plechner and Joseph M. Jarmus, Metuchen, N. J., assignors, by mesne assignments, to National Lead Company, New York, N. Y., a corporation of New Jersey No Drawing. Application June 27, 1936, Serial No. 87,664

17 Claims. (Cl. 134—58)

The present invention relates to uniform mixtures of pigments in waxes and the like, which are usually referred to as dispersions or suspensions. For the purpose of consistency, we have chosen to use the term "suspension" in this description of our invention and in the claims attached hereto, to designate, uniform and substantially stable mixtures of pigment particles in a waxy substance.

An object of our invention is to obtain suspensions of pigment particles in waxes which, when melted, do not readily separate into pigment particles and liquid wax. Another object of our invention is to devise novel methods for dispersing pigment particles uniformly throughout waxy substances. These and other objects of our invention will become apparent from the detailed description thereof.

Our invention is based upon the discovery that when a uniform suspension of pigment particles in waxy substances is effected with the aid of a polar-nonpolar compound, the dispersion can be rendered substantially stable, that is, exhibiting little or no tendency on the part of the pigment particles to settle out of suspension, by the addition of a different polar-nonpolar or polar compound.

Broadly described the method of our invention consists in intimately mixing pigment particles with waxy substances in admixture with a polar-nonpolar dispersing agent, then when a substantially uniform suspension has been obtained, adding thereto a different polar nonpolar or polar compound to retard settling of the suspended pigment particles.

A polar-nonpolar compound, as is known, is one which contains in its molecular structure atomic groupings which possess polarity and others which do not possess this property. Polarity of a molecule or atomic group is determined by the so-called electric moment and is a measure of the electric dissymmetry of the group or molecule. Thus, for example, a symmetrical molecule such as $N_2$ or $CH_4$ has zero electric moment and is completely nonpolar; whereas, o-dinitro-benzol which is not symmetrical, has an electric moment as recorded by Debye of 6.05 electrostatic units (in benzine) and is, consequently, relatively polar. (Cf. Debye, "Polar Molecules," The Chemical Catalog Company, 1929, p. 42 et seq.)

Metallic soaps contain a polar group in the form of the metal constituent and a nonpolar group in the form of an organic aliphatic radical. Metallic soaps are useful in the practice of our invention. Certain classes of organic compounds are also polar-nonpolar compounds. For example, polyhydric alcohols, especially glycerol, possess polar groups in the form of the hydroxy (—OH) radical. Triethanolamine also falls within this group. Generally, organic compounds which contain inorganic radicals may be regarded as being polar-nonpolar compounds; such inorganic radicals may consist of the metals or acid radicals, such as the halide, nitrate, sulfonate, etc., groups. It is also known that certain strictly organic groups possess in themselves a degree of polarity. In this category belong the ketonic, aldehydic, carboxylic groups, in addition to unsaturated groupings.

A polar compound is one which in its molecular structure contains only polar groupings. Broadly speaking, any compound capable of electrolytic dissociation is a polar compound. Inorganic acids, bases and salts fall within this category, as does water, which may be considered as made up of hydrogen (H) and hydroxyl (—OH) ions.

The function of the polar-nonpolar dispersing agent should not be confused with that of the polar-nonpolar or polar compound which is added to retard settling of the suspended pigment particles. It has been long known that pigments could not be readily dispersed in waxes, that is the individual pigment particles could not be wet by the wax and uniformly distributed throughout the mass. The use of various dispersing agents has been suggested. We have found that although dispersing agents help to break down aggregates of pigment particles and assist in uniformly distributing the particles throughout the waxy substances, suspensions so prepared do not possess a satisfactory stability. In other words, although dispersing agents tend to produce uniform dispersions of pigment particles in waxes they do not possess the property of keeping the pigment particles in suspension for long once the wax is melted. We found that it is necessary to supplement and/or complement the action of the dispersing agent by other agents whose function would be to keep the pigment particles in suspension after dispersion had been effected by means of a dispersing agent.

As stated above we have found that when a pigment is suspended in a wax by means of a polar-nonpolar dispersing agent, the resulting suspension may be rendered substantially stable by adding thereto a different polar-nonpolar or polar compound. Such compounds we designate as "anti-settling agents."

Although our invention is adaptable for preparing suspensions of pigments, either of the primary or extender types, it is particularly adapted for the preparation of suspensions of titanium pigments and zinc pigments in waxes. Thus, we have found that titanium dioxide, composite titanium dioxide pigments such as those in which titanium dioxide is intimately associated with an extender such as barium sulfate or calcium sulfate and titanate pigments such as calcium titanate, lead titanate, zinc titanate, etc., may be satisfactorily suspended in waxes by means of the novel methods herein set forth. The zinc pigments which may be advantageously used in our invention include zinc sulfide, zinc oxide, and the various lithophones including titanated lithopones.

By the terms "waxes" and "waxy substances" as employed by us in this description of our invention we mean to include not only the waxes of the ester type; that is, fatty acid esters of mono- or dihydric alcohols, but also mineral waxes, such as paraffin-wax, ozokerite, ceresin, Montan wax and the like.

The physico-chemical factors which enter into the preparation of uniform, more or less stable suspensions of pigment particles in various different media are little understood. Various dispersing agents have been suggested for dispersing pigment particles in drying oils and the like, but such teaching is of practically no value for preparing suspensions using different media. The solution of any problem involving the suspension of finely divided solids throughout a liquid or solid medium, by means of a dispersing agent, appears to depend upon the physical and chemical characteristics of the suspending media, the solid to be suspended, and the dispersing agent.

In the light of the foregoing it will be appreciated that the dispersibility of pigments in waxes may vary depending upon the physical and chemical characteristics of the pigment and the wax. Generally speaking, the dispersion of titanium or zinc pigments and especially in paraffin-wax and the stabilization of the resultant suspension presents the greatest difficulty.

We have found that in cases where the titanium or zinc pigment exhibits an especially marked tendency to settle out of suspension, it is desirable that the compound which is added to retard settling possess a higher degree of polarity than that which is employed as the dispersing agent. This is the preferred embodiment of our invention because, in all cases, more stable suspensions are obtained if the anti-settling agent has a higher degree of polarity than the dispersing agent.

Since the operability of our invention depends upon a physical property, viz. the electric dissymmetry of the dispersing and anti-settling agents rather than upon their chemical action, it will be understood that the particular chemical classes to which these agents may belong is not of great importance. Accordingly, a wide variety of chemical compounds of polar and polar-nonpolar nature may be employed in our invention for the preparation of suspensions of pigment particles in waxes without departing from the scope thereof. The choice will be made in accordance with the well known principles of polar molecules as set forth in scientific literature, for example, by Debye, supra. Generally speaking, the following considerations are also of assistance in the selection of the polar-nonpolar or polar compounds to act either as dispersing or anti-settling agents:

Compounds containing the hydroxyl (—OH), carboxyl (—COOH), aldehydic (—CHO), and ketonic (—CO—) groups may be regarded as having a relatively high degree of polarity when the non-polar portion of the molecule does not greatly exceed in weight the polar portion of the molecule. Thus, water (H.OH) is a highly polar substance. So, also, are the lower mono- and polyhydric alcohols (R.OH or R(OH)$n$). However, the polarity of the alcohols, aldehydes, ketones and carboxyl compounds decreases progressively with the increase in weight of the organic radical to which is attached the polar hydroxyl, aldehydic, ketonic and carboxyl groups. We have found that hydroxyl, aldehydic, ketonic and carboxyl compounds, the nonpolar constituent of which does not contain more than six carbon atoms, are most effective in the retardation of settling of titanium pigment particles suspended in a waxy substance.

On the other hand the polar-nonpolar compounds which possess a relatively low degree of polarity are those, the molecule of which is made up predominantly of the nonpolar groupings. Thus, hydroxyl, aldehydic, ketonic and carboxyl compounds, the nonpolar constituents of which contain more than six carbon atoms, will possess a decreasing polarity proportional with the increase in carbon atoms in a nonpolar group. We have found that such compounds are preferably employed in the practice of our invention as dispersing agents. In addition thereto, metallic soaps, for example, the metallic linoleates, linolates, oleates, palmitates, naphthenates of lead, cobalt, zinc, titanium, manganese, aluminum, etc. are useful for this purpose. Aluminum stearate and titanium stearate are particularly useful as dispersing agents for titanium dioxide in paraffin-wax. In this same class of polar-nonpolar organic compounds may be included other organo-inorganic compounds for example, organic halides, nitrates, sulfonates, etc., as well as unsaturated organic compounds, provided they possess electric dissymmetry.

The polar compounds which may be used as anti-settling agents will include not only ionizable inorganic acids, bases and salts, but ionizable organic acids such as tartaric acid, acetic acid, oxalic acid, etc. It will be understood, of course, that the anti-settling agents should be capable of being incorporated uniformly, either by dissolution, emulsification, or suspension in the wax and in the amount employed.

The amounts of the compounds which are to be employed as dispersing or anti-settling agents are relatively small. Roughly speaking, the anti-settling agent should be used in an amount about double the weight of the dispersing agent. Amounts of polar-nonpolar dispersing agents within the range of 0.05% to 5.0%, based on the weight of the waxy substances, are sufficient to produce a substantially homogeneous suspension of pigment particles in a waxy substance. The polar-nonpolar or polar anti-settling or suspending agent should be used in amounts within the range of 0.1% to 10.0%, based on the weight of the waxy substance.

It is desirable first to intimately mix the polar-nonpolar dispersing agent with the waxy substance before adding the pigment; preferably the waxy substance is melted, the dispersing agent added thereto with agitation, and while maintaining agitation, the pigment gradually added.

After the pigment has been thoroughly dispersed in the waxy substance the polar-nonpolar or polar anti-settling or suspending agent should then be added and thoroughly stirred into the mixture. The resulting suspension may then be cooled. As an alternative method of mixing, we found that milling the titanium pigment into a mixture of the waxy substance and the polar-nonpolar dispersing agent maintained at about the melting point of the waxy substance is very effective in thoroughly dispersing the pigment in the waxy substance. Similarly satisfactory suspensions may also be prepared by effecting the mixing on kneading rollers, slightly warmed if desired.

Another useful alternative method for practicing our invention is as follows: The pigment is first coated with the dispersing agent in any suitable known manner as by suspending the pigment in a solution of the dispersing agent and drying off the solvent. The pigment so treated is then incorporated in the wax in any desired manner, for example, as suggested above. Finally, the anti-settling agent is added to the pigment-wax dispersion.

Having described our invention we offer the following specific embodiments from which, however, no undue limitations as to quantities, temperatures and other conditions are to be construed.

Example No. 1

150 parts by weight of paraffin are melted at 80° C. 2 parts of aluminum stearate are thoroughly incorporated into the molten paraffin after which 100 parts of titanium dioxide is added. The mixture is then milled in a ball-mill at 80° C. for about one hour to disperse thoroughly the titanium dioxide. When dispersion is complete 3 parts of glycerine are added and thoroughly stirred into the suspension.

When cool the resulting suspension is a pure white homogeneous mixture of titanium dioxide in paraffin. It may be melted and kept in a molten state without any substantial settling of the particles of titanium dioxide.

Example No. 2

100 parts of beeswax are melted and 2 parts of titanium oleate are added thereto with stirring. 50 parts of a composite titanium dioxide-barium sulfate pigment are gradually added while maintaining the agitation. Stirring is continued until the titanium pigment has been thoroughly dispersed in the molten wax, which requires about one and one-half hours of stirring. 4 parts of triethanolamine are then added and the whole thoroughly mixed.

Example No. 3

200 parts of purified ceresin are melted and 4 parts of dodecyclic alcohol are thoroughly incorporated therewith. The mixture is allowed to cool until barely congealed. Then, upon mixing rolls, 100 parts of lead titanate are worked into the ceresin until a homogeneous dispersion is obtained. The mixture is then again melted and 7 parts of pentaerythritol, a tetrahydric alcohol, are added and thoroughly stirred into the mixture.

Example No. 4

100 parts by weight of zinc sulfide are thoroughly stirred into 400 parts of an aqueous solution containing 4 parts of sulphonated olive oil, filtered and dried at 120° C. The treated pigment is dispersed in 150 parts of paraffin melted at about 100° C. and then 2 parts of boric acid are added.

We regarded the pigment-wax suspensions prepared according to our invention as novel. Such suspensions when molten do not readily separate into wax and pigment portions as do suspensions prepared according to prior art methods. In the presence of the dispersing agent the pigment is uniformly distributed throughout the wax in a non-aggregated condition, that is, the pigment is separated into individual particles and does not exhibit the tendency of agglomerating which was the cause of prior art failures. In the presence of the anti-settling agent the pigment particles exhibit a greatly retarded rate of settling when the suspensions are melted.

Suspensions of titanium pigments in waxes prepared according to our invention are useful for many industrial purposes and may be melted and applied to the surface of paper to obtain opaque waxed paper, useful in the wrapping of food stuffs and like. They may similarly be used as coating materials for cloths and the like. In general, they are useful wherever there exists a demand for uniform pigmented wax suspensions.

In the foregoing description, we have used the term "dispersing agent" to designate the polar-nonpolar compound which assists in the formation of a uniform substantially homogeneous suspension of titanium pigment in a waxy material. By the terms "anti-settling agent" or "suspending agent", we mean to desigate that polar-nonpolar or polar compound which tends to retard the settling of the pigment particles after dispersion has been effected with the aid of a dispersing agent. In the claims appended hereto, we have used the term "dispersing agent" and "anti-settling agent" as hereto defined.

The foregoing detailed description of our invention has been given for clearness of understanding and undue limitations should not be deduced therefrom but the appended claims should be construed as broadly as possible in the light of the prior art.

We claim:

1. Method for the preparation of suspensions of inorganic pigment particles in waxes which comprises intimately mixing together pigment particles and a wax in admixture with a small amount of a polar-nonpolar compound to disperse the said inorganic pigment particles in the said wax, then adding to the resulting suspension a small amount of a different compound selected from the group consisting of polar-nonpolar and polar compounds possessing a higher degree of polarity than the said polar-nonpolar dispersing agent to retard settling of the suspended inorganic pigment particles.

2. Method for the preparation of suspensions of titanium and zinc pigments in waxes which comprises intimately mixing together a pigment selected from the group consisting of titanium pigments and zinc pigments and a wax in admixture with a small amount of a polar-nonpolar compound to disperse the pigment particles in the said wax then adding to the resulting suspension a small amount of a different compound possessing a higher degree of polarity than the said polar-nonpolar dispersing agent to retard settling of the suspended pigment particles.

3. Method for the preparation of suspensions of titanium pigments in waxes which comprises intimately mixing together a titanium pigment and a wax in admixture with a small amount of a polar-nonpolar compound to disperse the pigment particles, then adding to the resulting suspension a different compound possessing a higher degree of polarity than the said polar-nonpolar dispersing agent and in an amount about double the weight thereof to retard settling of the suspended titanium pigment particles.

4. Method for the preparation of suspensions of zinc pigments in waxes which comprises mixing together a zinc pigment and a wax in admixture with a small amount of a polar-nonpolar compound to disperse the pigment particles then adding to the resulting suspension a different compound possessing a higher degree of polarity than the said polar-nonpolar dispersing agent and in an amount about double the weight thereof to retard settling of the suspended zinc pigment particles.

5. Method for the preparation of suspensions of titanium pigments in waxes which comprises intimately mixing together a titanium pigment and a wax in admixture with a polar-nonpolar compound between 0.05 percent and 5.0 percent based on the weight of the wax to disperse the pigment particles, then adding to the resultant suspension an amount of another different compound possessing a higher degree of polarity than the said polar-nonpolar dispersing agent between 0.1 percent and 10 percent based on the weight of the wax to retard settling of the suspended titanium pigment particles.

6. Method for the preparation of suspensions of titanium pigments in waxes which comprises intimately mixing together a titanium pigment and a wax in admixture with a small amount of a metallic soap and then adding to the resulting suspension a small amount of a compound having a higher degree of polarity than the said metallic soap to retard settling of the suspended titanium pigment particles.

7. Method for the preparation of suspensions of titanium pigments in waxes which comprises intimately mixing together a titanium pigment and a wax in admixture with a small amount of a metallic soap and then adding to the resulting suspension a small amount of a polyhydric alcohol to retard settling of the suspended titanium pigment particles.

8. Method for the preparation of suspensions of titanium pigments in waxes which comprises intimately mixing together a titanium pigment and a wax in admixture with a small amount of a metallic soap and then adding to the resulting suspension a polyhydric alcohol in an amount about double the weight of the said metallic soap to retard settling of the suspended titanium pigment particles.

9. Method for the preparation of a suspension of titanium dioxide in paraffin wax which comprises intimately mixing together titanium dioxide and paraffin wax in admixture with a small amount of aluminum stearate then adding to the resulting suspension a small amount of glycerol to retard settling of the suspended particles of titanium dioxide.

10. In a method of preparing suspensions of titanium pigments in wax which comprises first dispersing a titanium pigment in a wax in admixture with a polar-nonpolar dispersing agent, the step which consists in adding to the said suspension a compound having a higher degree of polarity than the said polar-nonpolar dispersing agent to retard settling of the suspended titanium pigment particles.

11. In a method of preparing suspensions of titanium pigments in wax which comprises first dispersing a titanium pigment in a wax in admixture with a metallic soap, the step which consists in adding to the said suspension a small amount of a compound having a higher degree of polarity than the said metallic soap to retard settling of the suspended titanium pigment particles.

12. In a method of preparing suspensions of titanium pigments in wax which comprises first dispersing a titanium pigment in a wax in admixture with a metallic soap, the step which consists in adding to the said suspension a small amount of polyhydric alcohol to retard settling of the suspended titanium pigment particles.

13. Method for the preparation of suspensions of titanium and zinc in waxes which comprises suspending a pigment selected from the group consisting of titanium pigments and zinc pigments in a solution of polar-nonpolar dispersing agent removing the solvent from the pigment particles intimately mixing the so treated pigment particles with a wax and then adding to the resulting suspension a small amount of a compound possessing a higher degree of polarity than the said polar-nonpolar dispersing agent to retard settling of the suspended pigment.

14. A uniform suspension of a pigment in a wax comprising a wax, a pigment uniformly distributed throughout said wax in non-aggregated condition, in intimate admixture with a polar-nonpolar dispersing agent and an anti-settling agent possessing a higher degree of polarity than the said polar-nonpolar dispersing agent and exhibiting a retarded rate of separation into pigment and wax when in the molten state.

15. A uniform suspension of a zinc pigment in a wax comprising a wax, a zinc pigment uniformly distributed throughout said was in non-aggregated condition, in intimate admixture with a polar-nonpolar dispersing agent and an anti-settling agent possessing a higher degree of polarity than the said polar-nonpolar dispersing agent and exhibiting a retarded rate of separation into zinc pigment and wax when in the molten state.

16. A uniform suspension of a titanium pigment in a wax comprising a wax, a titanium pigment uniformly distributed throughout said wax in a non-aggregated condition, in intimate admixture with a polar-nonpolar dispersing agent and an anti-settling agent possessing a higher degree of polarity than the said polar-nonpolar dispersing agent and exhibiting a retarded rate of separation into titanium pigment and wax when in the molten state.

17. A uniform suspension of titanium dioxide in paraffin-wax comprising paraffin-wax and titanium dioxide uniformly distributed throughout the said paraffin-wax in non-aggregated condition in intimate admixture with a metallic soap and a polyhydric alcohol and exhibiting a retarded rate of separation into pigment and wax when in the molten state.

WALTER W. PLECHNER.
JOSEPH M. JARMUS.